United States Patent [19]
Jerabek

[11] 3,921,250
[45] Nov. 25, 1975

[54] SUCTION CLEANER AIR INLET DEVICE

[75] Inventor: Bohumil Jerabek, Ottawa, Canada

[73] Assignee: Jerabek & Associates Ltd., Ottawa, Canada

[22] Filed: May 29, 1974

[21] Appl. No.: 474,470

[52] U.S. Cl. .................... 15/353; 55/335; 55/418; 55/467
[51] Int. Cl.² ............................................ A47L 9/10
[58] Field of Search ................ 15/327 D, 352, 353; 55/204, 335, 418, 467, 472

[56] References Cited
UNITED STATES PATENTS

| | | | |
|---|---|---|---|
| 2,295,984 | 9/1942 | Wilson | 55/472 X |
| 2,440,860 | 5/1948 | Kalmeyer | 55/418 X |
| 3,165,774 | 1/1965 | Barba | 15/353 X |
| 3,618,297 | 11/1971 | Hamrick | 15/327 D X |

Primary Examiner—Harvey C. Hornsby
Assistant Examiner—C. K. Moore

[57] ABSTRACT

An air inlet device for a suction cleaner of the vertical tank type where the vertical cylindrical tank has an air inlet opening in an upper portion of the wall, has a means for mounting the device to the tank wall with a deflector positioned in front of the inlet opening to deflect air entering the tank. The deflector is a generally semi-cylindrical member with its curved portion spaced inwardly from the opening and extending horizontally in both directions to deflect incoming air in only two substantially opposed directions.

3 Claims, 5 Drawing Figures

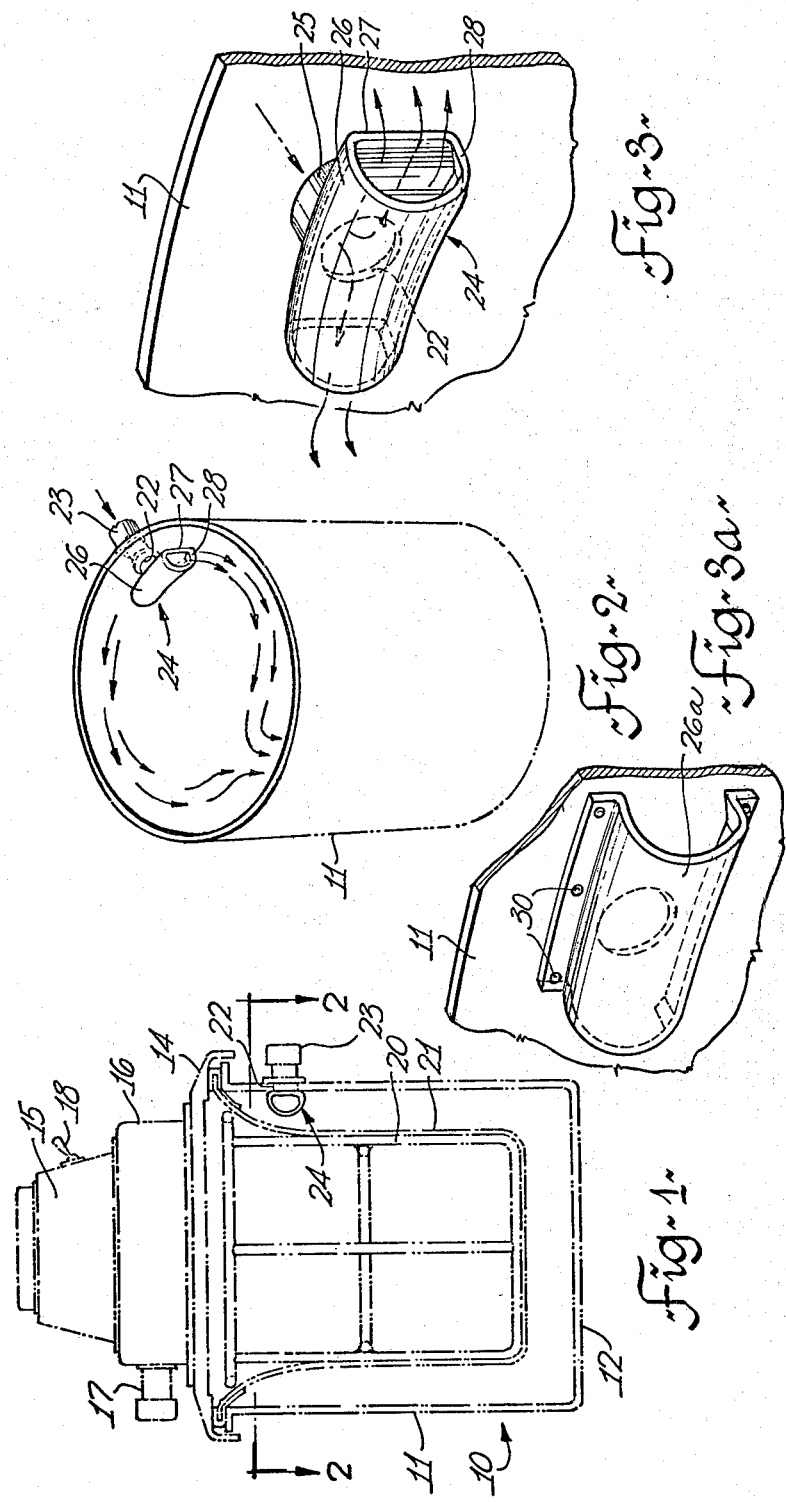

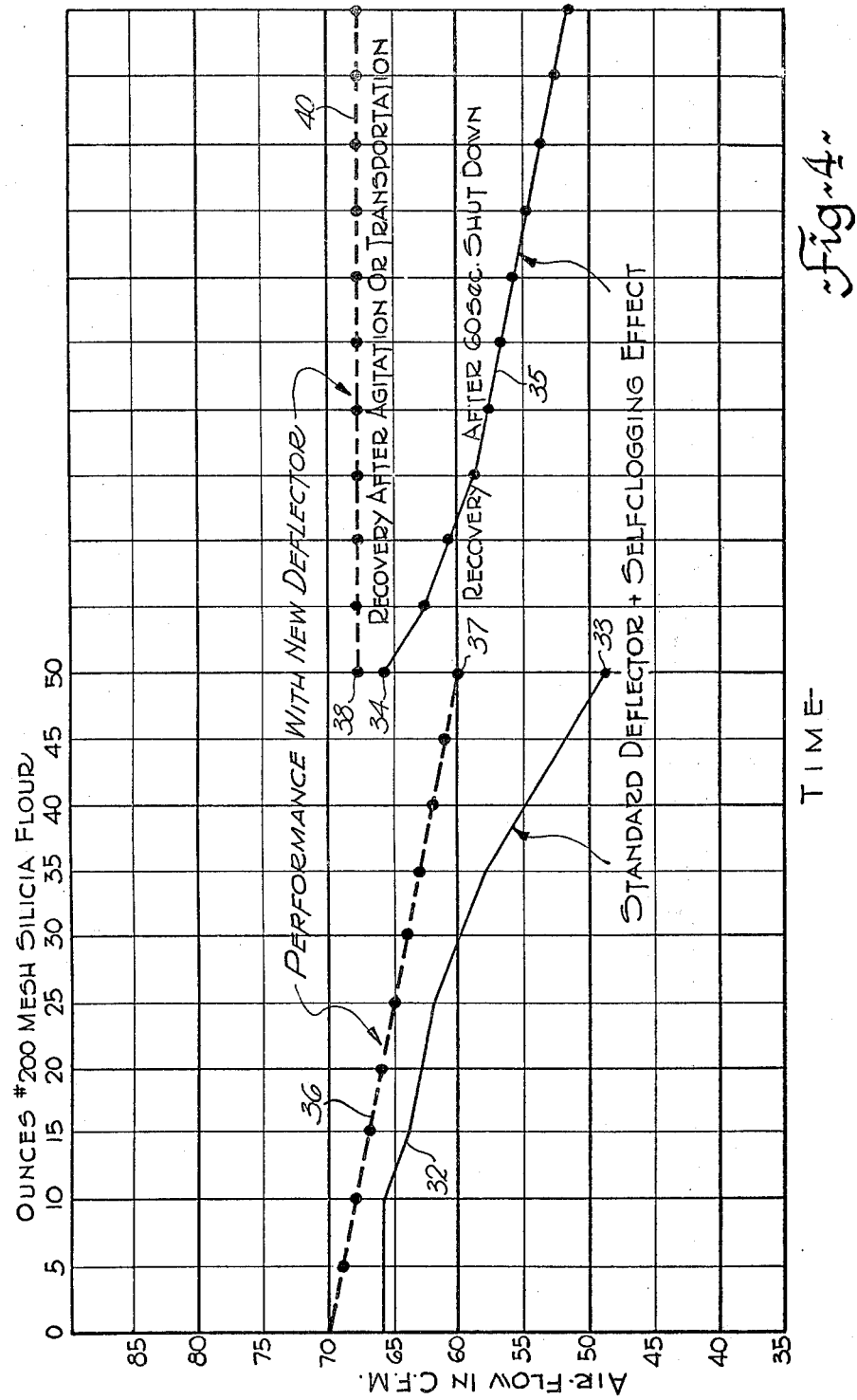

SUCTION CLEANER AIR INLET DEVICE

BACKGROUND OF THE INVENTION

This invention relates to an air inlet device for a suction cleaner of the vertical tank type.

Suction cleaners of the vertical tank type have a generally cylindrically shaped tank, used with the tank axis vertically oriented, and a filter cloth suspended or otherwise mounted within the tank. An air inlet in the cylindrical wall of the tank is provided with an external coupling for the attachment of a hose and some form of cleaner tool. An impeller or fan is driven by a motor to create suction drawing air and entrained dust and dirt through the air inlet into the tank, through the filter cloth to remove the entrained dirt, past the impeller or fan, where the air is discharged through a discharge outlet normally in the upper part of the cleaner.

One prior art cleaner of this type has an air deflector mounted within the tank in front of the air inlet to deflect the incoming air in a generally downwards direction. The deflector is in the form of an L-shaped channel mounted to the tank wall in an inverted position. The incoming air strikes the vertical part of the deflector and is directed generally downwards with some air spilling laterally from the open ends. It is thought this design was to provide an indirect path for the air flow which is downwardly towards the bottom of the tank and then upwardly to the filter and the discharge outlet. With this design particles which might otherwise tend to settle to the bottom of the tank during operation or which fall to the bottom from the filter when the cleaner is shut off, tend to be picked up by the air which is directed downwardly towards the bottom of the tank.

Another prior art cleaner of this type has an air deflector mounted within the tank in the form of a curved elbow which directs air and entrained dirt laterally in one direction around the inside of the tank to create a swirling movement of air similar to a whirlpool. It is thought this design was intended to cause the heavier particles to move outwardly to the tank wall and spiral downwardly to the bottom of the tank where these particles then collect. However, as the swirling motion of the air extends to the bottom of the tank, this motion either tends to inhibit settling or tends to pick up or entrain some of the settled particles.

Some of the prior art tank type cleaners are arranged to encourage dust particles which have collected on the filter cloth, blinding the filter cloth, to fall off when the cleaner is shut off or when the cleaner is shut off and agitated such as by moving the cleaner. This tends to partially clear the filter. However, a swirling air flow, or a downwardly directed air flow, tends to cause particles which are on the bottom of the tank to become entrained in the moving air and move towards the filter.

SUMMARY OF THE INVENTION

The present invention provides an air inlet device or deflector arrangement which causes an air flow within the tank that has little tendency to pick up or entrain particles of dust or dirt on the bottom of the tank and which encourages the settling of particles.

It is therefore an object of the invention to provide in a vertical tank type suction cleaner an improved air inlet device which directs incoming air so that it has little tendency to pick up or entrain particles on the bottom of the tank.

It is another object of the invention to provide in a vertical tank type suction cleaner an air inlet device which deflects or directs incoming air laterally in opposing directions.

According to the invention there is provided an air inlet device for a tank type suction cleaner having a vertical tank with an air inlet opening in the wall thereof. The air inlet device has means for engaging the tank wall at the opening to mount it in position and has a support means within the tank. A deflecting means on the support means extends substantially horizontally in both directions to deflect incoming air only in two substantially opposed directions.

The incoming air flows laterally around the tank wall to the side opposite the air inlet opening where the meeting air streams interact and create an area of turbulence. This area of turbulence appears to encourage heavier particles to be dropped to the bottom of the tank. There is little or no tendency to have the particles on the bottom of the tank picked up or re-entrained in the air flow because there is no swirling air flow which extends to the bottom of the tank.

BRIEF DESCRIPTION OF THE DRAWINGS

FIG. 1 is a sectional side view showing a vertical tank suction cleaner in phantom with an air inlet device according to the invention in position on the tank wall, FIG. 2 is a schematic isometric view showing a portion of the tank wall with an air inlet device of the invention mounted in position on the wall, FIG. 3 is a close up isometric view of the air inlet device according to the invention, FIG. 3A is an alternate version of the device of FIG. 3, and FIG. 4 is a graph useful in explaining the operation of the invention with reference to the operation of a typical prior art cleaner.

DESCRIPTION OF THE PREFERRED EMBODIMENTS

Referring first to FIG. 1, a typical vertical tank suction cleaner is indicated in phantom. The cleaner has a tank 10 with a cylindrical side wall 11 and a bottom 12. A cover 14 closes the top of the tank and is held in place by retaining means (not shown). A motor 15 drives an impeller housed in housing 16 which has a discharge outlet 17. A switch 18 is provided to switch the motor 15 on and off. A frame 20 within the tank supports a filter cloth 21. An inlet opening 22 is provided with a coupling 23 for coupling a hose (not shown) to the inlet 22. All the description so far relates to a known structure of a vertical tank suction cleaner, and is given to provide a better understanding of applicant's invention which relates to the air inlet.

The invention is best described with reference to FIGS. 1, 2 and 3 where the air inlet opening 22 is provided with an air inlet device 24 which has a cylindrical mounting portion 25 adapted to fit into air inlet opening 22 and be retained there either by a snug press fit or by a locking ring (not shown) incorporated in coupling 23, or other fastening means. The inner end of mounting portion 25 extends or projects within the tank 10 and has a deflector comprising a generally semi-cylindrical wall member 26 whose axis extends horizontally (i.e. laterally), and a substantially flat member 27 which is preferably curved to conform to the curvature of tank wall 11. The opening in the cylindrical mounting portion 25 communicates with the passage defined by semi-cylindrical wall member 26 and flat member 27 as is best seen in FIG. 3. The air drawn in through inlet 22 is discharged from the open ends of the passage defined by wall member 26 and flat member 27.

A preferred embodiment of the invention provides a slightly upturned lip 28 to the wall member 26 at its open end. This tends to direct the airflow slightly upwardly as it enters the tank and minimizes air disturbance at the bottom of the tank as will subsequently be described.

The air inlet device as shown in FIGS. 1, 2 and 3 is adapted for use as a replacement deflector device although it may be used as a deflector device in originally manufactured equipment. The embodiment shown in FIG. 3A is more suitable for use in originally manufactured equipment and is mounted directly to the tank wall 11 by rivets or screws 30. It consists of a semi-cylindrical wall member 26a. Because the wall member 26a is mounted directly to the tank wall 11, there is no need for a flat member similar to member 27 in FIG. 3. The semi-cylindrical wall member 26a is mounted in front of inlet opening 22, as before, and deflects the incoming air in opposed directions. A lip similar to lip 28 in FIG. 3 may also be provided.

The air inlet device of this invention may have alternate forms, but in all forms the incoming air is deflected only in two substantially opposed directions. Thus, the air flows laterally around the tank wall to the side opposite the air inlet opening where the meeting air streams interact and create an area of turbulence. This area of turbulence appears to encourage heavier particles to be dropped to the bottom of the tank. There is little or no tendency to have the particles on the bottom of the tank picked up or re-entrained in the air flow because there is no swirling air flow which extends to the bottom of the tank.

Referring now to FIG. 4 there is shown a graph plotting air flow in cubic feet per minute against time for a typical prior art vertical tank cleaner with an air inlet deflector deflecting in one direction to cause a swirling action (solid line) and for the same cleaner using the air inlet device of this invention (broken line). For the first ten units of time as shown in the graph, five ounces of fine (200 mesh) silica flour were added at each time unit for a total of 50 ounces. This silica flour provides a controlled addition of material resembling fine dust.

The air flow with the cleaner having a prior art single way deflector begins at about 66 cfm (cubic feet per minute) as shown by the solid line 32 and the addition of 10 ounces of silica flour has little effect. As the time increases and more silica flour is added the air flow drops to about 49 cfm at point 33. At this time the cleaner motor is stopped for 1 minute and the cleaner agitated to dislodge particles of silica flour from the filter to the bottom of the tank. The cleaner is then switched on again but no more silica flour is added. Any decrease in air flow from now on will be due to a self-clogging effect which is apparently caused by particles being picked up from the bottom of the tank.

When the cleaner is switched on again the air flow is restored substantially to the starting airflow of 66 cfm as indicated at point 34. However the airflow decreases, and continues to decrease, as shown by solid line 35, although no further silica flour is added.

When the prior art deflector is replaced by the deflector of this invention, the initial air flow is slightly higher at 70 cfm because of the reduced resistance at the deflector with two discharge paths. The airflow, indicated by broken line 36, falls relatively uniformly as the silica flour is added until it falls to about 60 cfm when the cleaner motor is shut off (point 37). It will be seen that the loss in air flow with the deflector of this invention is not as great as the loss of air flow with the prior art deflector. The cleaner remains shut off for one minute and agitated to dislodge particles from the air filter as before. The cleaner is then switched on, and no more silica flour is added. It will be seen the air flow is restored to about 68 cfm as is indicated by point 38 and the air flow continues at 68 cfm is indicated by broken line 40. This constant air flow indicates that substantially no material is being picked up from the bottom of the tank.

It is believed that the graph of FIG. 4 shows the advantages of the air inlet device of this invention, and it is believed these advantages result from the inventive structure described herein.

It is intended that the expression "suction cleaner" as used herein will include both suction cleaners which are used to clean surfaces and materials which are substantially dry, and suction cleaners which are used to clean surfaces and materials that have had a liquid and a detergent or soap applied thereto. It will be apparent that the air inlet device according to the invention may be used on either of these types of suction cleaner. In the prior art type of suction cleaner which has a deflector directing air around the tank to create a swirling movement (sometimes referred to as cyclonic air movement), there is a tendency when working with a liquid and soap or detergent for the foam or suds to build up within the tank because of the continuous swirling movement. This build up of foam or suds interferes with the operation of the cleaner. When an air inlet device of this invention is used, the build up of foam or suds is reduced or prevented. The foamy liquid is directed horizontally in two directions around the tank wall, meets at the opposite side of the tank, and flows to the bottom of the tank. There is no tendency to pick up liquid or foam from the bottom of the tank.

The air inlet device according to the invention may be made from any suitable metal or plastic material or similar material. However, a preferred form or embodiment of the invention uses a flexible or deformable material for at least the semi-cylindrical wall member 26 (FIGS. 2 and 3) or 26a (FIG. 3a). An additional advantage is obtained by the use of a flexible or deformable material, such as for example, rubber sheet material made with an inner fabric reinforcing layer. Such a material flexes slightly with changes in air pressure as the cleaner stops and starts and is used on different surfaces. This slight flexing action tends to dislodge deposits or particles of material which stick to the surface, and thus prevents a build up of a deposit. In addition, the use of a flexible material reduces the possibility of damage to the deflector by heavy particles which might abrade, crack or break a deflector of hard plastic material.

I claim:

1. An air inlet device for a tank type suction cleaner having a vertical tank with an air inlet opening in a wall thereof, comprising means for engaging the tank wall at said opening, deflecting means within said tank supported by said means for engaging the tank wall at said opening, said deflecting means extending substantially horizontally in both directions to deflect the incoming air in two substantially opposed directions, said deflecting means comprising a generally semi-cylindrical member with the curved portion spaced inwardly from said opening and the terminating portions of said member extending in a direction towards the wall of said tank, a lower edge of said deflecting means, where air is discharged from said deflecting means, having a lip inclined slightly upwardly to give an upward inclination to the path of the discharged air.

2. An air inlet device for a tank type suction cleaner having a vertical tank with an air inlet opening in an upper portion of the wall of said tank, comprising
   a cylindrical mounting portion for mounting within said opening and having a central passage,
   a base member on the inner end of said mounting portion, said base member having a curvature conforming to the curvature of the tank wall,
   a semi-cylindrical deflecting member on said base member forming an elongated passage communicating with said central passage and adapted to extend horizontally within said tank adjacent the tank wall for deflecting incoming air in only two opposing directions,
   said deflecting member having on a lower edge thereof at a point of discharge from said device, a lip inclined slightly upwardly to give an upward inclination to the path of the discharged air.

3. An air inlet device for a tank type suction cleaner having a vertical tank with an air inlet opening in an upper portion of the wall of said tank, comprising
   a semi-cylindrical deflecting member positioned in front of said inlet opening with the axis of said deflecting member being substantially horizontal and the curved portion extending inwardly from the wall,
   support flanges on the terminating portions of said deflecting member, and
   fastening means extending from said tank wall and engaging said support flanges to mount said deflecting member in position,
   said deflecting member having, on a lower edge thereof at a point of air discharge from said device, a lip inclined slightly upwardly to give an upward inclination to the path of the discharged air.

* * * * *